(12) United States Patent
Nicol

(10) Patent No.: US 7,699,368 B2
(45) Date of Patent: Apr. 20, 2010

(54) HOSE MANIPULATOR

(76) Inventor: John S. Nicol, 18806 Lebanon Rd., Spring Grove, VA (US) 23881

( * ) Notice: Subject to any disclaimer, the term of this patent is extended or adjusted under 35 U.S.C. 154(b) by 46 days.

(21) Appl. No.: 12/120,412

(22) Filed: May 14, 2008

(65) Prior Publication Data
US 2009/0284032 A1 Nov. 19, 2009

(51) Int. Cl.
B65G 7/00 (2006.01)
(52) U.S. Cl. .......... 294/26; 280/47.3; 414/457
(58) Field of Classification Search .......... 294/15, 294/19.1, 26, 58; 248/76, 80; 414/457; 280/47.3; 135/85
See application file for complete search history.

(56) References Cited

U.S. PATENT DOCUMENTS

| | | | | |
|---|---|---|---|---|
| 1,001,962 A * | 8/1911 | Landes | ............ | 414/457 |
| 1,051,083 A * | 1/1913 | Chambers | ............ | 248/80 |
| 1,316,239 A * | 9/1919 | Hogander | ............ | 414/457 |
| 1,428,285 A * | 9/1922 | Herbert | ............ | 224/267 |
| 2,517,507 A * | 8/1950 | Rowan | ............ | 294/26 |
| 2,882,084 A * | 4/1959 | Eatinger | ............ | 294/26 |
| 3,722,940 A * | 3/1973 | Misjak | ............ | 294/1.1 |
| 4,488,706 A * | 12/1984 | Kono | ............ | 254/131 |
| 4,580,825 A * | 4/1986 | Johnson | ............ | 294/24 |
| 4,968,049 A * | 11/1990 | Johnson | ............ | 280/47.24 |
| 5,000,405 A | 3/1991 | Rybak et al. | | |
| 5,171,052 A * | 12/1992 | Cunningham | ............ | 294/19.1 |
| 5,263,755 A | 11/1993 | Thompson | | |
| 5,288,090 A * | 2/1994 | Bross | ............ | 280/79.7 |
| 5,344,201 A * | 9/1994 | Offin | ............ | 294/24 |
| 5,782,477 A * | 7/1998 | Covert | ............ | 280/79.7 |
| 5,893,799 A * | 4/1999 | Studley et al. | ............ | 463/47.2 |
| 2004/0174027 A1* | 9/2004 | Bennett | ............ | 294/26 |

FOREIGN PATENT DOCUMENTS
WO    WO 2007038158 A1    4/2007

* cited by examiner

Primary Examiner—Dean J Kramer
(74) Attorney, Agent, or Firm—Dale J. Ream

(57) ABSTRACT

A hose manipulator according to the present invention includes an elongate shaft having upper and lower ends and extending between about 3 feet and about 5 feet in length. The hose manipulator also includes a handle at the shaft upper end, the handle having a portion extending generally perpendicular to the shaft. A hook is positioned at the shaft lower end and extends between about 150 degrees and about 180 degrees and includes a diameter between about 3 inches and about 6 inches. The hook and the perpendicular handle portion are generally coplanar.

11 Claims, 5 Drawing Sheets

HOSE MANIPULATOR

BACKGROUND OF THE INVENTION

This invention relates generally to firefighting equipment and, more particularly, to a hose manipulator with which large and heavy water hoses may be moved and manipulated without undue energy being expended by a firefighter.

Fire personnel are daily faced with dangerous circumstances related to fighting fires. Working amidst unpredictable and extreme conditions, firefighters go to battle with as much skilled manpower, equipment, and tools as are necessary to safely extinguish a fire. Unfortunately, over one hundred firefighters lose their lives every year, sometimes as a result of fatigue. Battling fires while wearing heavy safety gear sometimes results in firefighters becoming fatigued and, as a result, being unable to quickly exit a dangerous situation.

Various devices have been proposed in the art for handling heavy objects and, more particularly, for manipulating heavy fire hoses. Although assembly effective for their intended purposes, the existing devices and proposals are directed primarily to aiding a firefighter in holding a fire hose in use rather than the movement of heavy hoses from one location to another.

Therefore, it would be desirable to have a hose manipulator that enables an individual firefighter to move a heavy fire hose from one location to another or merely to straighten it so as to allow full water flow. Further, it would be desirable to have a hose manipulator that is lightweight, compact, and that enables a firefighter to hook a hose quickly and efficiently. In addition, it would be desirable to have a hose manipulator that minimizes bending or stooping by a firefighter when removing restrictions from a hose.

SUMMARY OF THE INVENTION

Therefore, a hose manipulator according to the present invention includes an elongate shaft having upper and lower ends and extending between about 3 feet and about 5 feet in length. The hose manipulator also includes a handle at the shaft upper end, the handle having a portion extending generally perpendicular to the shaft. A hook is positioned at the shaft lower end and extends between about 150 degrees and about 180 degrees and includes a diameter between about 3 inches and about 6 inches. The hook and the perpendicular handle portion are generally coplanar.

Therefore, a general object of this invention is to provide a hose manipulator for moving or straightening a fire hose with minimal lifting, bending, or stooping.

Another object of this invention is to provide a hose manipulator, as aforesaid, having a hook for substantially surrounding a hose such that the hose may be manipulated by moving the hook.

Still another object of this invention is to provide a hose manipulator, as aforesaid, having a shaft, handle, and hook that are configured relative to one another so as to minimize physical effort while maximizing the work accomplished.

A further object of this invention is to provide a hose manipulator, as aforesaid, that is simple to use, lightweight, and economical to manufacture.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

A hose manipulator will now be described in detail with reference to FIG. 1 through FIG. 5 of the accompanying drawings. More particularly, the hose manipulator 100 includes an elongate shaft 110 and a hook 140.

Figure 4:
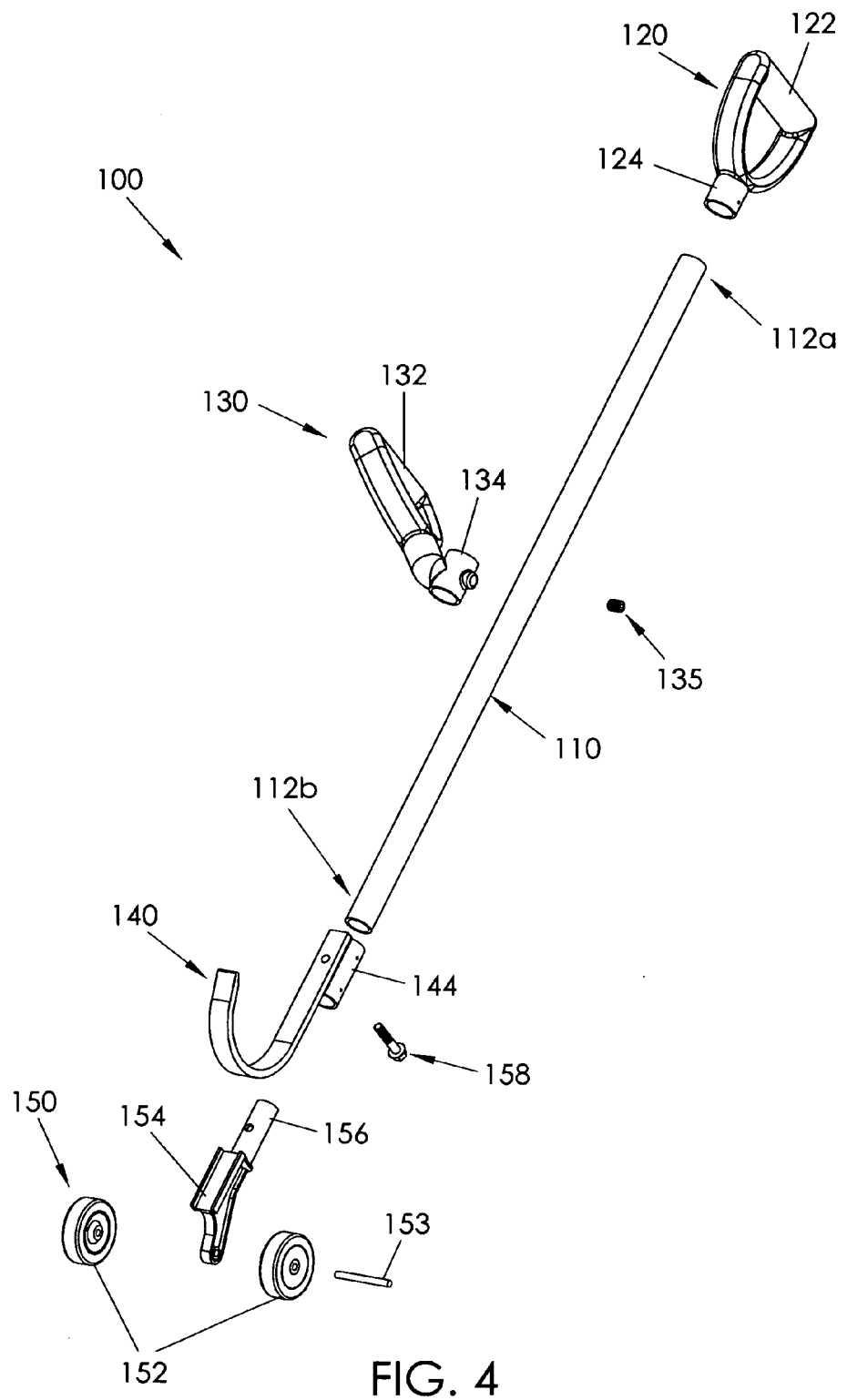
FIG. 4 is an exploded view of the hose manipulator as in FIG. 3.

As shown in FIG. 4, the shaft 110 has upper and lower ends 112a, 112b and extends between about 3 feet and about 5 feet in length. The shaft 110 may be, for example, a hollow cylinder (as shown in the drawings), or the shaft 110 may be any other appropriate elongate shape. Appropriate materials for constructing the shaft 110 include metals and fire-resistant composites, for example.

Figure 1:
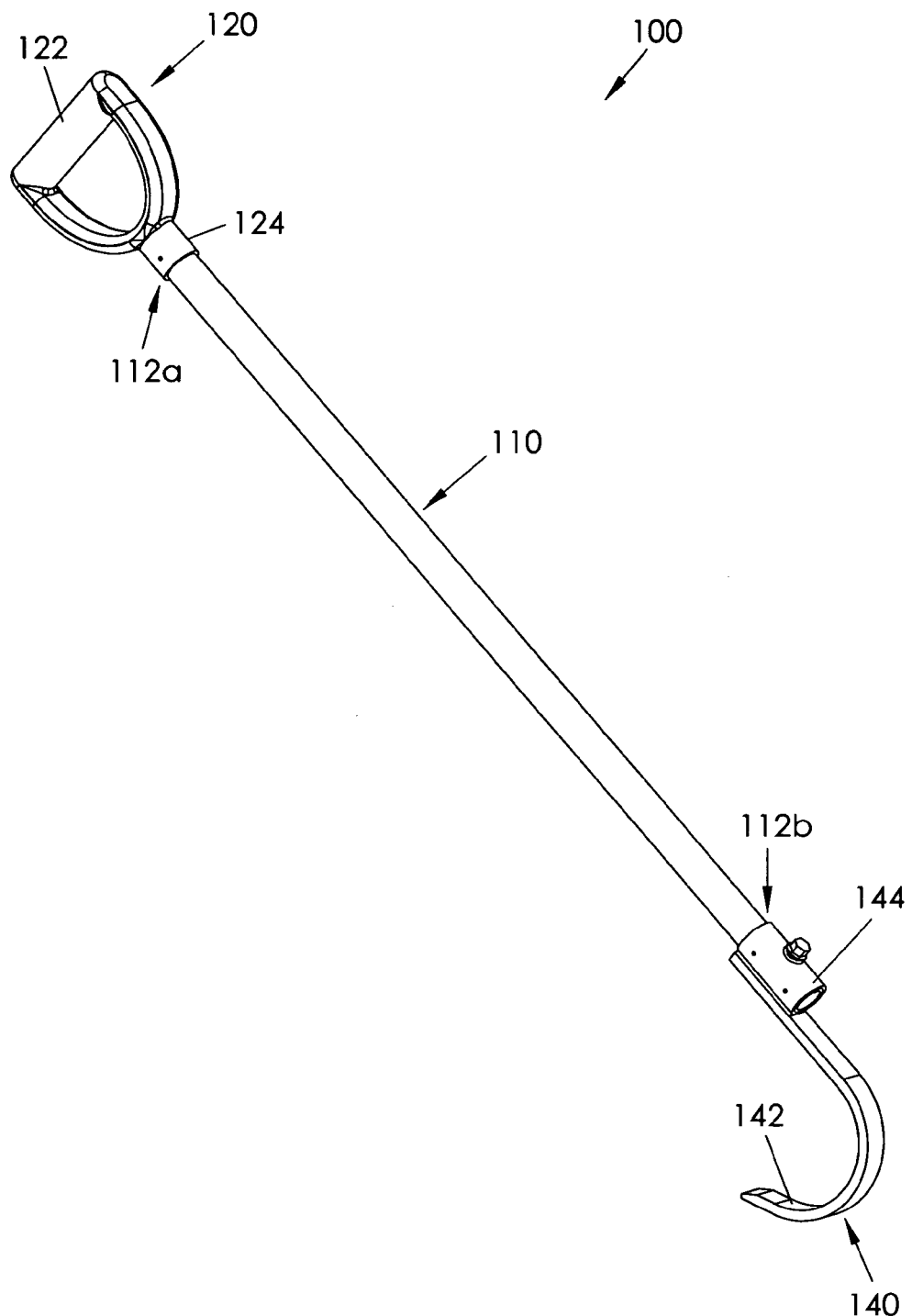
FIG. 1 is a perspective view of a hose manipulator according to a preferred embodiment of the present invention.

A handle 120 may be at the shaft upper end 112a and may have a grip portion 122 offset from the shaft 110. In some embodiments, a portion (e.g., the grip portion 122) may extend generally perpendicular to the shaft, as shown in FIG. 1. The grip portion 122 may include ergonomic features, such as finger indentations, cushioning, etc. As shown in FIG. 4, the handle 120 may include a collar 124 that is coupled to the shaft 110 by a fastener (e.g., adhesive, a screw, a bolt, threads, etc.), or the handle 120 may be unitary with the shaft 110 or otherwise coupled to the shaft 110.

Figure 2:
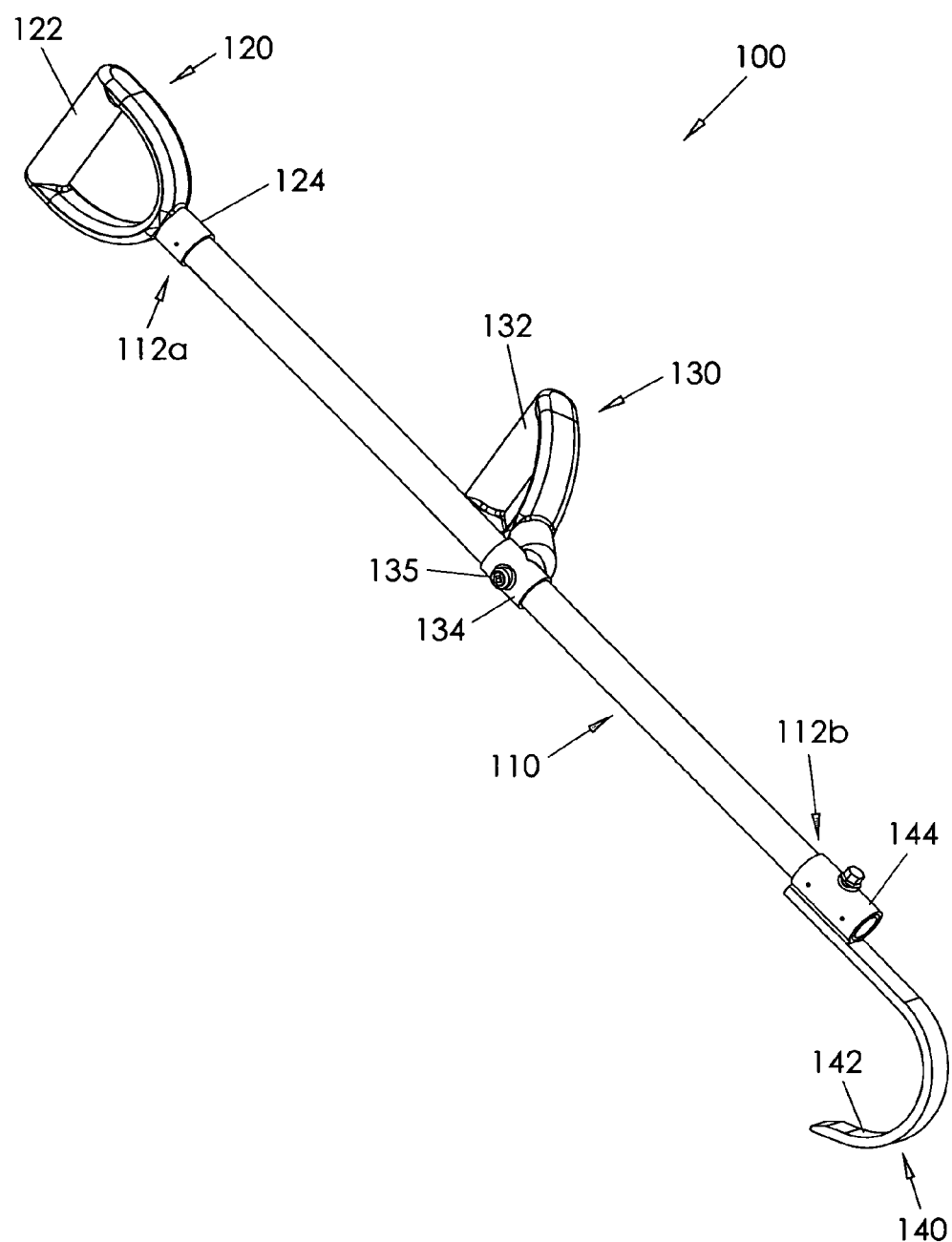
FIG. 2 is a perspective view of the hose manipulator as in FIG. 1 from another angle and with an auxiliary handle.
Figure 3:
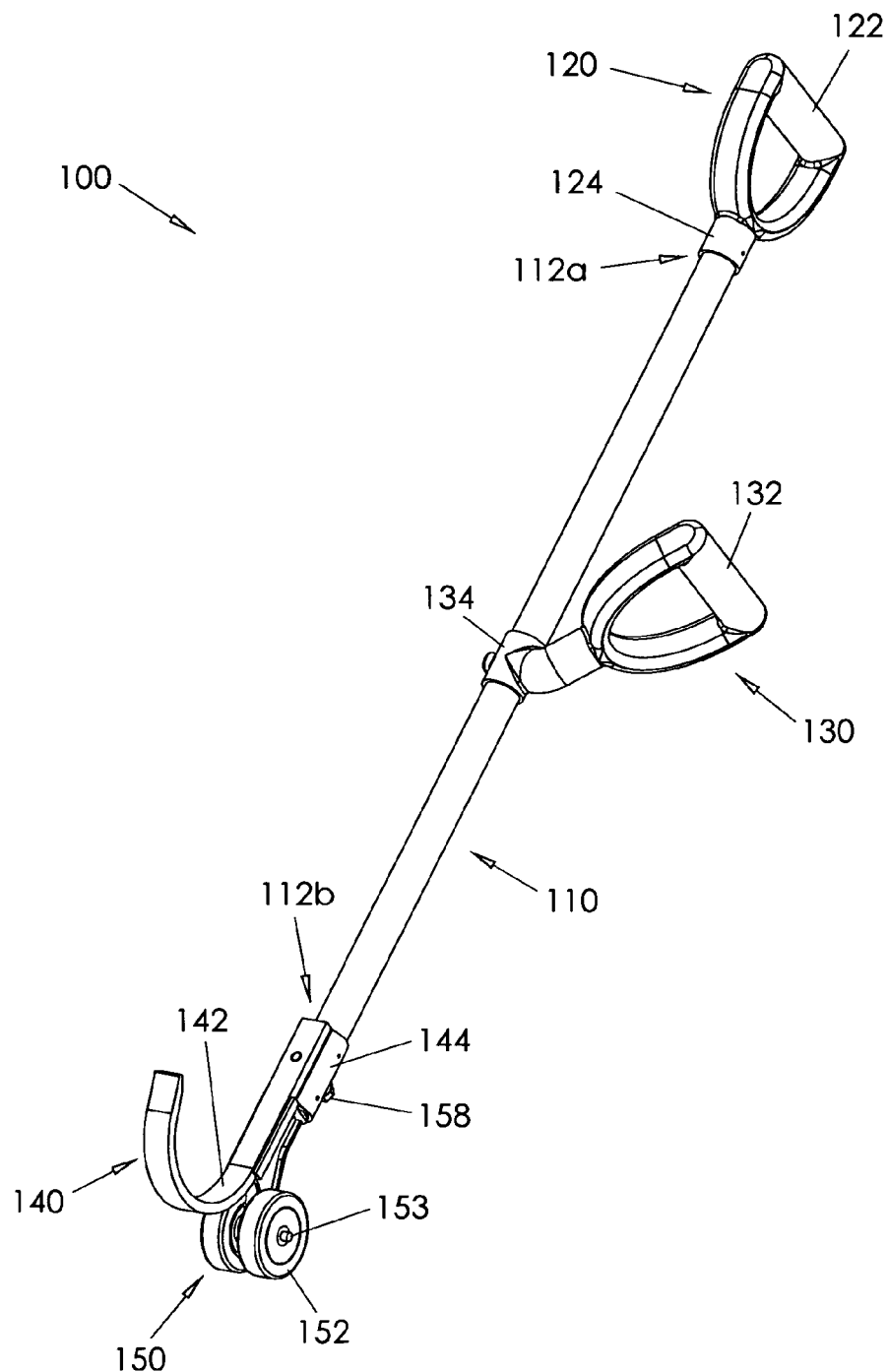
FIG. 3 is a perspective view of the hose manipulator as in FIG. 2 from another angle and with a transport member.

As shown in FIGS. 2, 3, and 4, an auxiliary handle 130 may be coupled to the shaft 110 between the upper and lower ends 112a, 112b. A grip portion 132 of the auxiliary handle 130 may be offset from the shaft 110 and may include ergonomic features, such as finger indentations, cushioning, etc. The auxiliary handle 130 may include (or be coupled to) a collar 134 that is coupled to the shaft 110. More particularly, the shaft 110 may pass through the collar 134. In some embodiments, the collar 134 may be immovably coupled to the shaft 110, such as by adhesive, a screw, a bolt, threads, etc. In other embodiments, the collar 134 may be movably coupled to the shaft 110, such as by a set screw 135, a screw, a bolt, a pin, etc.

The hook 140 is positioned at the shaft lower end 112b and extends between about 150 degrees and about 180 degrees, as shown in FIGS. 1, 2, and 3. In some embodiments, the hook 140 has a diameter between about 3 inches and about 6 inches (i.e., a radius between about 1.5 inches and about 3 inches). As shown in FIGS. 1, 2, and 3, the hook 140 and the handle grip portion 122 may be generally coplanar, and the hook 140 may have a generally flat inner surface 142. A width of the hook 140 may be generally equal to a width of the shaft 110. The hook 140 may include (or be coupled to) a collar 144 that extends around and is coupled to the shaft 110 by a fastener (e.g., adhesive, a screw, a bolt, threads, etc.), or the hook 140 may be otherwise coupled to the shaft 110.

Figure 5:
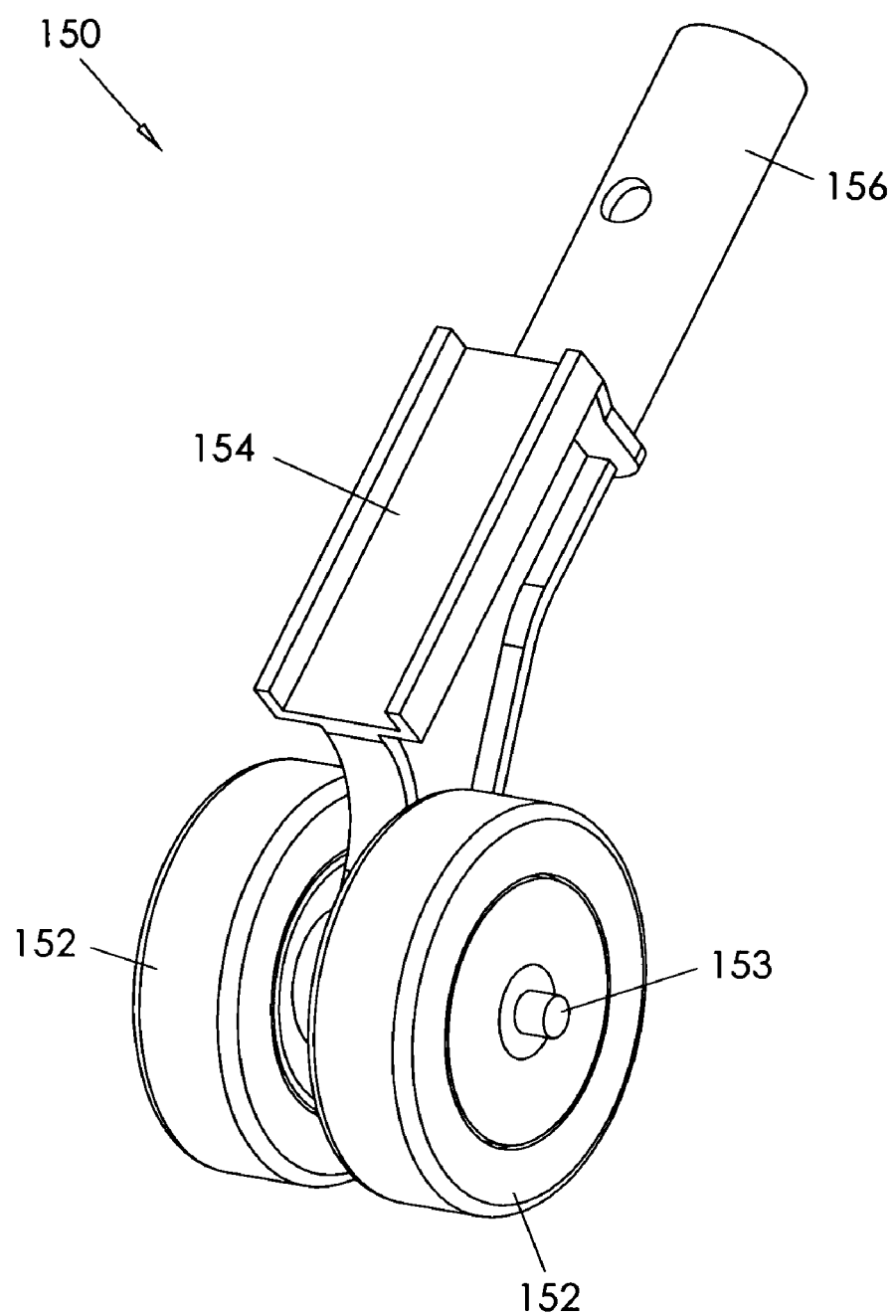
FIG. 5 is a perspective view on an enlarged scale of the transport member as in FIG. 4.

As shown in FIGS. 3, 4, and 5, a transport member 150 may be removably coupled to the shaft lower end 112b. The transport member 150 has at least one wheel 152, and the axis of rotation 153 for the wheel 152 may be generally perpendicular to the perpendicular handle portion (e.g., grip portion 122) and generally perpendicular to the shaft 110, as shown in FIG. 3. The transport member 150 may define a channel 154 (FIG. 5), and the hook 140 may be received in the channel 154 when the transport member 150 is coupled to the shaft lower end 112b (FIG. 3). A portion 156 of the transport member 150 may extend inside the shaft lower end 112b and/or the hook collar 144 when the transport member 150 is coupled to the shaft lower end, as is clear from viewing FIGS. 3 and 4. The portion 156 of the transport member 150 may be removably coupled to the hook collar 144, such as by a set screw, a screw, a bolt 158, a pin, threads, etc., or the transport member 150 may be otherwise operatively coupled to the shaft lower end 112b.

In use, hoses used to transport fluids (e.g., water) often become restricted or "kinked", which prevents or hinders the flow of fluid. As such, it may be desirable to straighten out these hoses during use. It may also be desirable to straighten out hoses to make stowing the hoses easier. While the hose manipulator 100 may be used with various hoses, it may be particularly useful with heavier hoses, such as those used by firefighters. Use of the hose manipulator 100 may make straightening such hoses easier and may eliminate many uncomfortable activities for the user, such as repeated or continuous bending or stooping.

A user may hold the hose manipulator 100 by the handle 120 and/or the auxiliary handle 130 (which may be placed along the shaft 110 in a comfortable position and removably coupled thereto, as set forth above) and position the hook 140 around the hose needing to be moved. The hose may be, for example, extended along the ground. The user may then move the hose by moving the hook 140. If the transport member 150 is included, the user may utilize the wheel(s) 152 to move the hose with minimal effort.

It is understood that while certain forms of this invention have been illustrated and described, it is not limited thereto except insofar as such limitations are included in the following claims and allowable functional equivalents thereof.

The invention claimed is:

1. A hose manipulator, comprising:
a hollow cylindrical shaft having upper and lower ends and extending between about 3 feet and about 5 feet in length;
a handle at said shaft upper end, said handle having a grip portion offset from said shaft;
a hook at said shaft lower end, said hook extending between about 150 degrees and about 180 degrees and having a diameter between about 3 inches and about 6 inches, said hook being coupled to a collar extending around said shaft;
wherein said hook and said handle grip portion are generally coplanar;
an auxiliary handle; and
means for movably coupling said auxiliary handle to said shaft.

2. The hose manipulator of claim 1, further comprising a transport member removably coupled to said shaft lower end, wherein:
said transport member has at least one wheel;
said at least one wheel has an axis of rotation that is generally perpendicular to said shaft;
said transport member defines a channel;
said hook is received in said channel when said transport member is coupled to said shaft lower end; and
said transport member has a portion that extends inside at least one of said shaft lower end and said hook collar when said transport member is coupled to said shaft lower end.

3. The hose manipulator of claim 2, wherein said shaft has a width and said hook has a width that is generally equal to said shaft width.

4. A hose manipulator, comprising:
a hollow cylindrical shaft having upper and lower ends and extending between about 3 feet and about 5 feet in length;
a handle at said shaft upper end, said handle having a grip portion offset from said shaft;
a hook at said shaft lower end, said hook extending between about 150 degrees and about 180 degrees and having a diameter between about 3 inches and about 6 inches, said hook being coupled to a collar extending around said shaft;
wherein said hook and said handle grip portion are generally coplanar;
a transport member removably coupled to said shaft lower end, wherein:
said transport member has at least one wheel;
said transport member defines a channel; and
said hook is received in said channel when said transport member is coupled to said shaft lower end.

5. The hose manipulator of claim 4, wherein said transport member has a portion that extends inside at least one of said shaft lower end and said collar coupled to said hook.

6. The hose manipulator of claim 5, further comprising an auxiliary handle coupled to said shaft, said auxiliary handle being selectively movable along said shaft.

7. The hose manipulator of claim 4, further comprising an auxiliary handle coupled to said shaft, wherein:
a collar is coupled to said auxiliary handle;
said shaft passes through said auxiliary handle collar; and
a fastener couples said auxiliary handle collar to said shaft.

8. A hose manipulator, comprising:
an elongate shaft having upper and lower ends and extending between about 3 feet and about 5 feet in length;
a hook at said shaft lower end, said hook extending between about 150 degrees and about 180 degrees and having a diameter between about 3 inches and about 6 inches, said hook having a generally flat inner surface;
an auxiliary handle coupled to said shaft between said upper and lower ends, said auxiliary handle having a grip portion offset from said shaft;
a transport member removably coupled to said shaft lower end, said transport member defining a channel and having at least one wheel, said hook being received in said channel when said transport member is coupled to said shaft lower end; and
wherein said transport member has a portion that extends inside said shaft lower end when said transport member is coupled to said shaft lower end.

9. The hose manipulator of claim 8, wherein:
a collar is coupled to said auxiliary handle;
said shaft passes through said auxiliary handle collar; and
a fastener couples said auxiliary handle collar to said shaft.

10. The hose manipulator of claim 9, wherein said fastener movably couples said auxiliary handle collar to said shaft.

11. The hose manipulator of claim 8, wherein said shaft has a width and said hook has a width that is generally equal to said shaft width.

* * * * *